United States Patent Office 3,293,314
Patented Dec. 20, 1966

3,293,314
EQUILIBRATION OF LOWER ALKYL SUBSTI-
TUTED AROMATIC HYDROCARBONS
John J. Brodbeck, El Cerrito, Calif., assignor to Chevron
Research Company, a corporation of Delaware
No Drawing. Filed Mar. 4, 1965, Ser. No. 437,317
10 Claims. (Cl. 260—668)

This invention relates to a method of improving the equilibration selectively of solid mixed metal oxide catalysts.

It is known to isomerize vaporized lower alkyl substituted aromatic hydrocarbons at elevated temperatures by passing the vapor into contact with solid mixed metal oxide catalysts. A purpose in these equilibrations is to alter the position isomer distribution of the aromatic hydrocarbon treated. More particularly, the objective is to convert the feed into a mixture of isomeric compounds which is more nearly approximate to the well known equilibrium composition of the specific feed compound or mixture. In practice, the foregoing equilibration is coupled with a subsequent physical or chemical means for preferential and selective removal from the equilibrate, for example, of a single desired isomer. By recycle of the residue and repetition of the overall operation, one is able to convert a single isomeride or mixture to a different and desired specie of the isomeric equilibrium set.

A serious difficulty and limitation in the foregoing conversions by equilibration arises from the fact that the solid mixed oxide catalysts in general exhibit several substantial catalytic activities, the desired equilibration activity and at least one type of coke producing activity. These latter effects are responsible for irreversible conversion of an appreciable portion of the feed to by-products which are alien to the isomeric equilibration set and to coke.

A particular problem incidental to the undesirable coke formation is the deposition of the coke on the mixed oxide catalyst thereby clogging the catalyst surface and pores as well as the reactor vessel. This deposition also blocks the active isomerization sites of the solid catalyst as the deposit increases in extent. Consequently, the catalyst operates at an ever decreasing rate of equilibration activity, and after relatively short periods of operation the process must be interrupted for substantial periods for the purpose of regenerating the catalyst by a carbon removal step, by burning-off using air. In commercial practice duplicate reactors and associated regeneration equipment are conventionally required for these oxide catalyzed processes in which one unit is operated in the regeneration mode while the other is onstream.

Where carbon deposition can be essentially eliminated or the rate of formation can be sufficiently reduced, carbon burn-off for coke removal can be eliminated from the process scheme. For a plant in being, this permits an increase in isomerization capacity and for a projected new plant, the reduction in cost for reactor vessel, and associated regeneration equipment is very substantial.

It has now been found that the relative equilibration activity of acidic, solid, mixed metal oxides having catalytic isomerization and coke formation activities is substantially improved in the equilibration of vaporizable lower alkyl substituted aromatic hydrocarbons when the vaporized hydrocarbon is contacted with an acidic mixed metal oxide catalyst under isomerizing conditions in the presence of at least about 10 parts of ammonia vapor per million parts of hydrocarbon feed. The added presence of the ammonia during these oxide promoted equilibrations of lower alkyl substituted aromatic hydrocarbons inhibits carbon formation thereby markedly increasing the relative isomerization activity of the oxide. Coke lay-down on the catalyst is essentially eliminated or reduced to a negligible level as process factor making unnecessary costly frequent periodic catalyst regeneration cycles and duplication of reactors.

It appears that different types of acidic functions are responsible in the main for catalytic equilibration activity on the one hand and catalytic coke formation activity on the other. This is demonstrated in a preferred mode of operation, that is, where some water vapor is also added to the process stream. Thus when the hydrocarbon feed plus a minor amount of water is contacted with the catalyst, a determinable level of equilibration activity is notable as well as an appreciable coke formation. The addition of a small amount of $NH_3$ to the feed as noted above substantially eliminates the coke formation, and the desired equilibration activity is found to be affected in but a small degree. When the ammonia is subsequently eliminated from the feed, as in a continuous run over the same catalyst, after a relatively short interval, coke formation again becomes a major problem. At least a minor amount of ammonia must be present in the hydrocarbon feed stream for effective reduction of coke formation during acidic, solid, mixed metal oxide catalyzed equilibrations of the subject aromatic hydrocarbons.

According to a preferred method of the present equilibration process, a vaporizable lower alkyl substituted aromatic hydrocarbon feed, such as a non-equilibrium xylene mixture, is contacted, along with added ammonia and water vapor, each of the added components being added in an amount less than about 25,000 parts per million parts by weight of hydrocarbon feed, in an equilibration zone, with a catalyst comprising a solid acidic mixed metal oxide such as a silica-alumina mixture. The equilibration zone is maintained at an elevated temperature below about 1000° F. but above about 600° F., preferably at about 750–950° F. and is maintained at a pressure in the range 0.1 to 200 atmospheres, preferably of the order of .5–10 atmospheres. Space rates are generally within the range of from about 0.1 to 10 L.H.S.V. (liquid hourly space velocity).

By equilibration is meant partial as well as substantial development of equilibrium concentrations of the members of a set of compounds. That is, by equilibration is meant the overall chemical transformative mechanisms by which an equilibrium mixture is generated or approximated for the given temperature which includes position isomerization in a major degree and in lesser degree transalkylation, and disproportionation of lower alkyl substituent groups relative to aromatic hydrocarbon nuclei of lower alkyl substituted aromatic hydrocarbons.

A wide variety of solid mixed metal oxide lower alkyl substituted aromatic hydrocarbon equilibration and isomerization catalysts are known in the art and are known to suffer from coke formation activity in their use as isomerization catalysts. The catalytic activity of these materials is ascribed in large part to acid functions of the Lewis and Broensted type made possible by crystal lattice defects apparently resulting from the mixing of two or more solid metal oxides. The use of these catalysts is contemplated in the present process. For reasons of cost and ease of preparation, activated synthetic, gel-type, siliceous and aluminum oxide based catalysts are preferred. On the other hand activated (as by heating and the like) natural mixed oxides, clays and the like, are also useful.

Representative oxides found in these mixtures are silica, alumina, magnesia, thoria, boria, manganese oxide, chromia, tungsten oxide, molybdenum oxide, beryllia, zirconia, rare earth metal oxides, acid treated natural clays, thermactivated clays as well as natural and synthetic zeolites including the several cation-exchanged forms of these zeolites. Decationized molecular sieves are also useful. Other oxides include titania, vanadia, cobalt oxide, iron oxide and the like. In general, the foregoing mixed oxides are acidic, and concurrent formation of coke is a serious problem in their use as equilibration catalysts. Coke formation and cracking is substantially reduced by the addition of ammonia to the hydrocarbon feed streams for these catalysts in general.

The preferred acidic siliceous mixed metal oxide type catalysts useful in the present process are well known and described in the art, and of course, their preparation etc. is not a part of the instant invention. Most commonly, they are mixtures of silica and alumina as described by McKinley in U.S. 2,142,324, U.S. 2,147,985, and by Reeves in U.S. 2,403,757, and in the subsequent improved versions described as silica activated alumina and as alumina activated silica, the difference being in the relative amounts of each component. Both high surface area and low surface area siliceous catalysts are useful as well as steam treated silica-alumina composites. Other acidic oxide compositions such as silica-magnesia, silica-zirconia, silica-titania, silica-chromia, silica-thora and the like are useful but for reasons of cost are less desirable than silica-alumina compositions. More complex acidic, siliceous catalysts, that is composed of more than 2 metal oxides, are also useful, for example, composites of silica, alumina, and magnesia and the like.

By lower alkyl is meant an alkyl group having less than four carbon atoms per group.

The present invention is useful in the equilibration of a large number of lower alkyl substituted aromatic hydrocarbons. Thus, equilibrations of any vaporizable, isomerizable lower alkyl substituted aromatic hydrocarbons whose acidic mixed metal oxide catalyzed isomerizations are known to be accompanied by coke formation in a vapor phase isomerization or equilibration at temperatures below about 1050° F. are improved in general by the introduction of minor amounts of ammonia to the reaction zone.

Preferred feed compounds and their mixtures are lower alkyl substituted aromatic hydrocarbons having less than 14 carbocyclic aromatic ring carbon atoms per molecule. Substitution solely by one or more lower alkyl groups is contemplated, and by definition this is exclusionary of aryl and the like aromatic substituents.

The most preferred feed hydrocarbons useful in the present process are of the general formula $$C_6H_{6-n}R_n$$

wherein R is a lower alkyl group, and $n$ is an integer in the range 1–5, inclusive, and their non-equilibrium mixtures.

Representative aromatic hydrocarbon feeds useful in the process include non-equilibrium aromatic hydrocarbon mixtures in general isomeride reduced mother liquors such as a para-xylene mother liquor; individual feed compounds such as o-xylene, m-xylene, mesitylene, durene, isodurene, toluene and higher methyl substituted benzenes. Similarly, ethylbenzene, paraethyl toluene, pseudocumene, 1,2,3-trimethylbenzene and the like are contemplated, in mixtures as well as individually as suitable feeds. Analogous naphthalene and indene, compounds are also useful feed compounds to the process.

Example 1

Into a continuous fixed bed catalyst testing unit fitted for temperature, pressure and feed control was changed a commercial mixed metal oxide cracking catalyst in the form of beads in the particle size range 4–8 mesh and a surface area of 327 m.²/gram. The composition of the beads was 10% alumina and 90% silica by weight. Using a para-xylene reduced xylene mixture containing about 300 parts of water per million parts of xylene feed under the following conditions:

Temperature, ° F. _____ 915
Liquid hourly space velocity _____ 1.6
Pressure, atm. _____ 1.1
Time, hrs. _____ 4 ammonia addition to the feed stream was found to effect carbon deposition on the catalyst as follows:

| Run No. | Additive, p.p.m. Feed | | Coke Formation Wt. Percent, Catalyst |
|---|---|---|---|
| | NH₃ | H₂O | |
| 1 | None | None | 0.31 |
| 2 | 87 | None | 0.25 |
| 3 | 210 | None | 0.05 |
| 4 | 250 | None | (est.) 0.015 |
| 5 | 3,400 | None | 0.01 |
| 6 | None | 11,000 | 0.34 |
| 7 | 3,300 | 7,700 | ¹ <.0005 |

¹ Estimate based on similar 30 day continuous run.

These data demonstrate that the addition of ammonia to a mixed metal oxide catalyzed equilibration of lower alkyl substituted aromatic hydrocarbons is effective for the inhibition of coke formation and lay-down on the solid catalyst.

The isomerization levels for the above runs were determined. Isomerization level is the ratio of the para-xylene fraction of the total xylene in the product to the corresponding para-xylene fraction at equilibrium multiplied by one hundred. The results found were as follows:

| Run No. | Additive, p.p.m. Feed | | Isomerization Level, Percent |
|---|---|---|---|
| | NH₃ | H₂O | |
| 1 | 0 | 0 | 100 |
| 2 | 87 | 0 | 97.5 |
| 3 | 210 | 0 | 96.4 |
| 4 | 250 | 0 | 95 |
| 5 | 3,400 | 0 | 80.7 |
| 6 | 0 | 11,000 | 102.2 |
| 7 | 3,300 | 7,700 | 90.2 |

The data demonstrate that the additions of as little as a trace of ammonia to the equilibration feed inhibits coke lay-down on the mixed metal oxide catalyst. Incremental amounts of added ammonia above about 250 parts per million parts of feed are helpful, but the improvement per added unit of ammonia is much less than in the range 5–250 parts. As much as 3000–4000 parts of ammonia on the other hand while probably excessive in terms of efficiency is permissible.

The data also show that the addition of water alone improves isomerization level but that coke lay-down on the catalyst is also appreciable. On the other hand, added ammonia makes possible virtual elimination of coke lay-down but with some loss in equilibration activity. The small loss in activity is readily regained by increasing temperature. In the absence of ammonia, an incremental temperature increase, 15–30° F., causes coke formation to become a problem, but in the presence of ammonia this is not the case.

As an equilibration catalyst ages in use, there is experienced a small gradual loss in activity. Since the presence of ammonia permits the use of higher temperatures without severe coking problems, this decline can be systematically compensated for by gradually increasing the reaction temperature. Depending upon the particular catalyst employed, it has an optimum operational mode, usually below about 750° F. When the activity decline becomes apparent, an increase in the reactor temperature by from about 0.2 to 10° F. per day has been found to be sufficient to maintain the desired activity level. At about 950°–1000° F. further increases in temperature are no longer effective.

For the mixed ammonia-water additive system, the amount of ammonia required varies and depends upon the particular feed compound, the liquid hourly space velocity, and catalyst employed. In general, from about 10 to 4000 parts by weight of ammonia and from about 100 to 50,000 parts of water are used based upon 1 million parts of aromatic hydrocarbon feed compound. The use of from 50–400 parts of ammonia and 5000 to 25,000 parts of water per 1 million parts of feed is usually most advantageous.

In Table II following is listed comparative data relative to typical feed and equilibration product compositions.

TABLE II

| Run No | 3 | 5 | 7 |
| --- | --- | --- | --- |
| Conditions: | | | |
| Temp., °F | 915 | 915 | 915 |
| Time, Hrs | 4 | 4 | 4 |
| Pressure, Atm | 1.1 | 1.1 | 1.1 |
| L.H.S.V., v./v./hr | 1.63 | 1.63 | 1.63 |
| $NH_3$, p.p.m | 210 | 3,400 | 3,300 |
| $H_2O$, p.p.m | | | 7,700 |
| Feed Composition, Wt. Percent: | | | |
| Aliphatics [1] | 2.8 | 2.8 | 3.1 |
| Benzene | 0.1 | 0.1 | 0.0 |
| Toluene | 3.8 | 3.8 | 3.6 |
| Ethylbenzene | 19.0 | 19.0 | 20.6 |
| p-Xylene | 8.7 | 8.7 | 9.9 |
| m-Xylene | 52.5 | 52.5 | 52.6 |
| o-Xylene | 11.9 | 11.9 | 9.7 |
| $C_9$ Aromatics | 0.9 | 0.9 | 0.4 |
| $C_{10}$ Aromatics | 0.3 | 0.3 | 0.1 |
| Product Composition, Wt. Percent: | | | |
| Aliphatics | 2.8 | 2.9 | 3.0 |
| Benzene | 0.5 | 0.0 | 0.3 |
| Toluene | 4.7 | 3.8 | 4.2 |
| Ethylbenzene | 19.6 | 18.9 | 19.4 |
| p-Xylene | 15.7 | 13.6 | 14.9 |
| m-Xylene | 39.4 | 44.4 | 43.3 |
| o-Xylene | 15.0 | 14.6 | 13.1 |
| $C_9$ Aromatics | 1.9 | 1.5 | 1.5 |
| $C_{10}$ Aromatics | 0.4 | 0.3 | 0.3 |
| Isomerization Level, Percent | 96.4 | 80.7 | 90.2 |

[1] A complex mixture of alkanes and naphthenes.

In addition to illustrating the desired conversion of the feed into a para-xylene richer equilibrated effluent product stream, these data illustrate that aliphatics, i.e., alkanes and naphthenes, are essentially unaffected by the process conditions. Therefore, while undesirable from the view of reduced efficiency in the use of reactor space, substantial amounts of non-aromatic hydrocarbons can be tolerated in the feed to the process.

Trace amounts of light volatile impurities in the aromatic feed streams are found to adversely affect isomerization catalyst life. This is demonstrated in the following example wherein the aromatic hydrocarbon feed was given a pretreatment by passage through a molecular sieve bed. Molecular sieves having pore diameters below about 15 angstroms are useful for the removal of such impurities in a hydrocarbon feed as carbon dioxide, carbon monoxide, hydrogen sulfide, nitrogen oxides, formaldehyde, methanol and the like and oxygenated hydrocarbons.

*Example 2*

A para-xylene reduced xylene mother liquor was passed in the liquid phase at about 20° C. through a 4 angstrom molecular sieve bed. The effluent mother liquor was then isomerized using a space velocity of 0.7, and a pressure of 1.1 atmospheres. About 265 parts of ammonia and 25,000 parts of water per million parts of hydrocarbon feed were also introduced into the isomerization zone. The following catalyst deactivation rate was determined:

```
                                     Percent loss in
                                     isomerization
Feed:                                level per day
  Untreated _____ 0.8
  Treated _____ [1] 0
```

[1] No measurable reduction of activity over 120 hour period.

Having described the above invention by examples and description thereof, it is to be understood that no undue restrictions or limitations are to be drawn by reason of the specific examples and that many variations and modifications are within the scope of the invention.

I claim:
1. In the equilibration of a non-equilibrium lower alkyl substituted isomerizable aromatic hydrocarbon feed characterized by vapor phase contacting said feed in a reaction zone at a temperature in the range from about 600–1000° F., a pressure less than about 200 atmospheres and a liquid hourly space velocity less than about 10, with a solid acidic mixed metal-oxide catalyst having equilibration and coke forming activities, the improvement which comprises effecting said contacting in the presence of added ammonia and thereby inhibiting coke formation.

2. The process of claim 1 wherein for each million parts of hydrocarbon feed introduced into said reaction zone from about 10 to 4000 parts by weight of ammonia and from about 100 to 50,000 parts of water vapor are introduced into said reaction zone.

3. The process of claim 2 wherein said hydrocarbon is of the general formula $$C_6H_{6-n}R_n$$

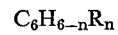

wherein R is a lower alkyl group, and $n$ is an integer in the range 1–5, inclusive, and their non-equilibrium mixtures.

4. In the equilibration of a non-equilibrium lower alkyl substituted isomerizable aromatic hydrocarbon feed by contacting in a reaction zone said feed in the vapor phase at a temperature in the range from about 600–1000° F., at a pressure less than about 200 atmospheres and at a liquid hourly space velocity less than about 10, with a solid, acidic, siliceous mixed metal-oxide catalyst having equilibration and coke forming activities, the improvement which comprises effecting said contacting in the presence of added ammonia and thereby inhibiting coke formation.

5. The process of claim 4 wherein for each million parts of hydrocarbon feed introduced into said reaction zone from about 10 to 4000 parts by weight of ammonia and from about 100 to 50,000 parts of water vapor are introduced into said reaction zone.

6. The process of claim 4 wherein said hydrocarbon is of the general formula $$C_6H_{6-n}R_n$$

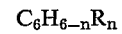

wherein R is a lower alkyl group, and $n$ is an integer in the range 1–5, inclusive, and their non-equilibrium mixtures.

7. In the isomerization of a non-equilibrium para-xylene reduced predominantly xylene hydrocarbon feed mixture characterized by vapor phase contacting said feed in a reaction zone at a temperature in the range from about 600–1000° F., a pressure less than about 200 atmospheres and a liquid hourly space velocity less than about 10, with a silica-alumina isomerization catalyst having isomerization and coke forming activities, the improvement which comprises effecting said contacting in the presence of added ammonia and thereby inhibiting coke formation.

8. The process of claim 7 wherein for each million parts of hydrocarbon feed introduced into said reaction zone from about 10 to 4000 parts by weight of ammonia and from about 100 to 50,000 parts of water vapor are introduced into said reaction zone.

9. The process of claim 8 wherein prior to said contacting said xylene feed in the liquid phase is passed through a molecular sieve adsorption bed for removal of adsorbable trace impurities in said feed, thereby substantially reducing the decline rate of the isomerization activity of said catalyst.

10. The process of claim 5 wherein said isomerization is initiated at a temperature in said range and continued until the isomerization activity of said catalyst begins to decline, thereafter incrementally increasing the temperature in the reaction zone by an amount in the range from about 0.2 to 10° F. per day up to a temperature not greater than about 1000° F., thereby maintaining the isomerization activity of said catalyst at a substantial level.

References Cited by the Examiner

UNITED STATES PATENTS 2,719,183   9/1955   Beodeker et al. _____ 260—668
3,200,162   8/1965   Kawai _____ 260—668

DELBERT E. GANTZ, *Primary Examiner.*

G. E. SCHMITKONS, *Assistant Examiner.*